(12) United States Patent
Gu (10) Patent No.: US 6,992,984 B1
(45) Date of Patent: Jan. 31, 2006

(54) CREDIT-BASED ADAPTIVE FLOW CONTROL FOR MULTI-STAGE MULTI-DIMENSIONAL SWITCHING ARCHITECTURE

(75) Inventor: Garry Z. Gu, Holmdel, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/520,677

(22) Filed: Mar. 7, 2000

(51) Int. Cl.
*H04L 12/26* (2006.01)
*H04L 12/28* (2006.01)
*H04L 12/50* (2006.01)

(52) U.S. Cl. .................... 370/235; 370/412; 370/386
(58) Field of Classification Search ........... 370/229, 370/230, 230.1, 232, 235, 236, 236.1, 386, 370/387, 388, 412–416, 417, 418, 396, 253, 370/249, 235.1
See application file for complete search history.

(56) References Cited

U.S. PATENT DOCUMENTS

| | | | |
|---|---|---|---|
| 5,689,500 A * | 11/1997 | Chiussi et al. | 370/235 |
| 5,790,770 A * | 8/1998 | McClure et al. | 709/231 |
| 5,917,805 A * | 6/1999 | Manning et al. | 370/236 |
| 5,978,359 A * | 11/1999 | Caldara et al. | 370/236 |
| 6,021,115 A | 2/2000 | Simpson et al. | 370/235 |
| 6,032,205 A | 2/2000 | Ogimoto et al. | 710/33 |
| 6,172,963 B1 * | 1/2001 | Larsson et al. | 370/229 |
| 6,249,819 B1 * | 6/2001 | Hunt et al. | 709/232 |

* cited by examiner

*Primary Examiner*—Steven Nguyen
*Assistant Examiner*—Marcia Gordon (57) ABSTRACT

The novel credit-based adaptive flow control method and system for multi-stage, multi-dimensional, data switching architecture. The method and system of the present invention estimates and balances data flow in the switch architecture by using statistical information derived from the normal switching operation without requiring specific information from the previous stage. The multi-stage multi-dimensional switching architecture of the present invention includes three stages. The first and third stages are the buffering stages, and the second stage acts as a buffer-less crossbar switch node. Each stage includes an array of switching elements, and each element includes either a queuing processor or an arbitration processor arranged to progressively refine estimates of the data traffic from switch elements in the first stage by the second stage. The second stage maintains the statistic of valid traffic arrival and departure, and feedback grant information bit to the first stage. The first stage treats every grant information as credit for each data departure to the second stage, and sends the data if there is a grant credit available. The adaptive filtering process adjusts a threshold adaptively, rendering the statistical properties to resemble a chosen probability distribution.

25 Claims, 6 Drawing Sheets

CREDIT-BASED ADAPTIVE FLOW CONTROL FOR MULTI-STAGE MULTI-DIMENSIONAL SWITCHING ARCHITECTURE

TECHNICAL FIELD OF THE INVENTION

The present invention relates generally to switch architecture, and more particularly to credit-based adaptive traffic flow control for a multi-stage multi-dimensional switch.

BACKGROUND OF THE INVENTION

Conventional multi-stage, multi-dimensional switching architecture typically includes three stages. The first and third stages are the buffering stages while the second stage acts as a bufferless crossbar switch node. Each stage includes an array of switching element and each element includes either a queuing processor or an arbitration processor which makes decisions to route arriving data packets from any input port to any output port.

Because of its easy scalability and expandability, the multi-stage, multi-dimensional switching technique has been acceptable in many types of switched architecture including many data switch applications. On the other hand, disadvantages of such switching techniques include complex algorithms required for employing the switch resulting in a substantial switching latency. As generally recognized by those skilled in the art, the routing algorithms required in the multi-stage, multi-dimensional switch architecture are complex. Further, such routing algorithms become exponentially more complex with increasing number of switching elements within an architecture. The more complex algorithms require more complex internal data structures in the bidding stage (first stage) and the granting stage (second stage), additional switch tag fields, more complex bidding process, and ultimately longer time for a grant/reject response to a bid to turn around. The increasing number of switching elements within the architecture also creates greater potential contention for any bidding effort. These disadvantages associated with the multi-stage, multi-dimensional switch architecture have prompted a need for additional research in the field.

One example of the bottlenecks in the complex routing algorithms is that data packets from many or all input ports of the first-stage may arrive at a specific input port of the second-stage at the same time, resulting in a severe contention consequence. An active bidding and granting procedure is considered as a primary solution for this problem. Current research activities mainly concentrate on techniques for improving the active bidding and granting process, and pushing the design to the limit of state-of-the-art fabrication technology. However, many timing constraints resulting in bidding and granting logic as well as interfaces between these two stages make active bidding and granting logic hard to implement, and make the grant response to the bid very hard to happen within a reasonable time period. This problem becomes even worse when more and more switch elements are involved. Therefore, it is highly desirable to have a self-adjustable flow control technique for the multi-stage, multi-dimensional switching architecture which does not require any specific data fields from the upstream switch element, and of which the complexity is not related to the number of increasing switching elements within a switch architecture.

Switches providing interconnections between nodes on a network invariably include some type of a traffic flow control technique. The credit-based flow control technique is one such traffic flow control technique. The credit-based flow control technique currently available in the market and generally known to those skilled in the art are typically designed for flow control between two switch elements, referred to as hubs, at a network level on a one-to-one basis. The hub-to-hub, credit-based, flow control usually resolves congestion earlier as compared to the end-to-end flow control techniques. Although different versions of this technique have been adopted in many switch products, the credit-based flow control technique has not yet been applied inside a switching hub.

Filtering techniques are generally known and have been applied in various applications. For example, an adaptive filtering technique has been applied to radar antenna arrays. Additionally, one-dimensional applications of adaptive filtering may be found in the field of electronics and also in the field of data routing known as adaptive directory routing. Furthermore, multi-dimensional adaptive filtering is currently being applied to digital image processing applications. Generally, however, the adaptive filtering technique has not yet been applied to a data switch design. Moreover, multi-dimensional filtering has not been applied to any type of a network design.

SUMMARY OF THE INVENTION

The present invention combines credit-based flow control, multi-stage multi-dimensional switching, and adaptive filtering together and seamlessly applies them to a mesh of switching elements. More particularly, the present invention adopts a multi-dimensional adaptive filtering mechanism into a multi-stage, multi-dimensional, switching architecture.

The adaptive filtering process in one embodiment of the present invention is accomplished by adaptively adjusting a "threshold" array or grant credit. When employed, the adaptive filtering process of the present invention drives the statistical properties of the network to conform to nearly uniform probability distribution.

In accordance with the goals of the present invention, there is provided a novel multi-stage, multi-dimensional, credit-based adaptive flow control method. In one embodiment, each crossconnect element of the second stage accumulates the statistics of data packet arrivals and departures on per-port based, and notifies the first stage with a single token bit whenever the second stage receives a data packet from a specific output port, for example, output port #i, of the first-stage, and departs it. The value of an up/down counter for this specific output port is maintained until the data packet is departed from the second stage.

The first stage switch elements update the grant credits associated with the output port #i when notified by the token bit from the second stage, and then waits for next data packet arrival from external nodes. The grant credit updates generally apply to three integrator blocks associated with three neighboring output ports of the first stage, subtracting one credit from the output port which has just sent out a data packet to the second stage, and simultaneously adding one credit to two of its next neighboring integrator blocks.

The first stage switch elements use the updated grant credit information to decide to which second stage switch element, i.e., crossconnect element, the next data packet should be sent. The advantage of doing so is that the first stage knows where to route an incoming packet prior to its arrival so that the active bidding alternative, i.e., the first stage sends a bid to the second stage to request an access grant, is no longer needed. This leads to relaxing many stringent design requirements, and therefore, larger network meshes can be built as a result.

Upon every arrival at the first stage, the credits with all the output ports in each first stage element may be scanned in the ascending order from 0 to N-1 to find a maximum. The data packet is then sent via the output element with the maximum credit to the second stage.

Another aspect of the present invention includes a simple credit feedback loop embedded into the data stream from the second stage to the third stage, and the third stage relays the credit token back to the first stage. Further, the first stage and third stage may be on the same chip or the same board.

Yet another aspect of the present invention includes a plurality of interconnected digital logic blocks including second stage statistic blocks, first stage integrator blocks, and first stage threshold blocks. The second stage statistics blocks are arranged to maintain the real-time statistics of data packet arrivals and departures. The first stage integrator blocks receive logic values from the statistics blocks and update grant credits accordingly. The first stage threshold blocks look for an output port with maximum grant credits and forward the packets via the output port to second stage where feedback tokens are then generated and sent back to the first stage.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

The embodiments of the present invention will now be described, by way of example only, with reference to the accompanying drawings in which.

DETAILED DESCRIPTION OF THE INVENTION

Figure 1:
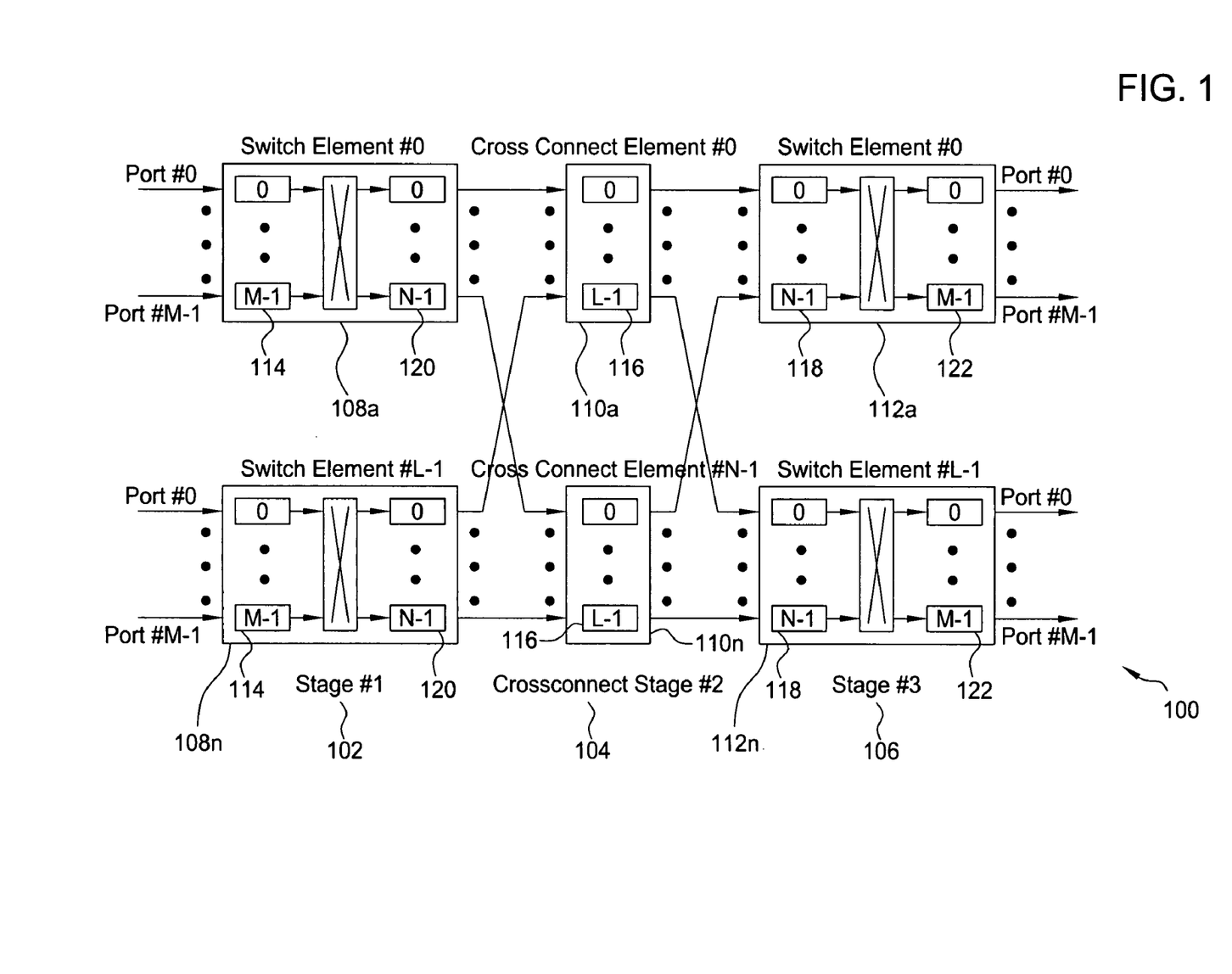
FIG. 1 shows a three-stage multi-dimensional switch architecture to which the method of the present invention is applied.

FIG. 1 shows the architecture of a three-stage multi-dimensional switch fabric 100 in one embodiment of the present invention. Briefly, a switching element is a basic building block of a switch and generally includes devices for providing inputs and outputs. As generally known to those skilled in the art of network switches, a switching fabric refers to an interconnection of switching elements. As shown in FIG. 1, the switch architecture 100 of the present invention includes at least three stages. The first stage 102 includes an array of switch elements 0 to L-1 (108a, 108n). The third stage also includes an array of switch elements 0 to L-1 (112a, 112n). Each switch element 108a, 108n has M physical input ports (or queues) 114 and N physical output ports 120 which route the incoming data to the next stage. Each third stage switch element 112a, 112n has N physical input ports (or queues) 118 and M physical output ports 122 which route the incoming data to an external node. Preferably, N is greater than M to ensure non-blocking capability of each switch element. The second stage includes an array of cross-connect elements 0 to N-1 (110a, 110n). Each cross-connect element (110a, 110n) includes L physical port processors 116 each performing the space-domain switching. Space-domain switching is known to those skilled in the art of network switches and generally describes internal switch routing structure that allows connections between every input to every output.

In one embodiment of the present invention, the credit-based adaptive flow control is applied between first stage 102 and second stage 104 to eliminate the conventional active bid-and-grant process. The credit-based adaptive flow control of the present invention will now be described in greater detail with reference to FIG. 2.

Figure 2:
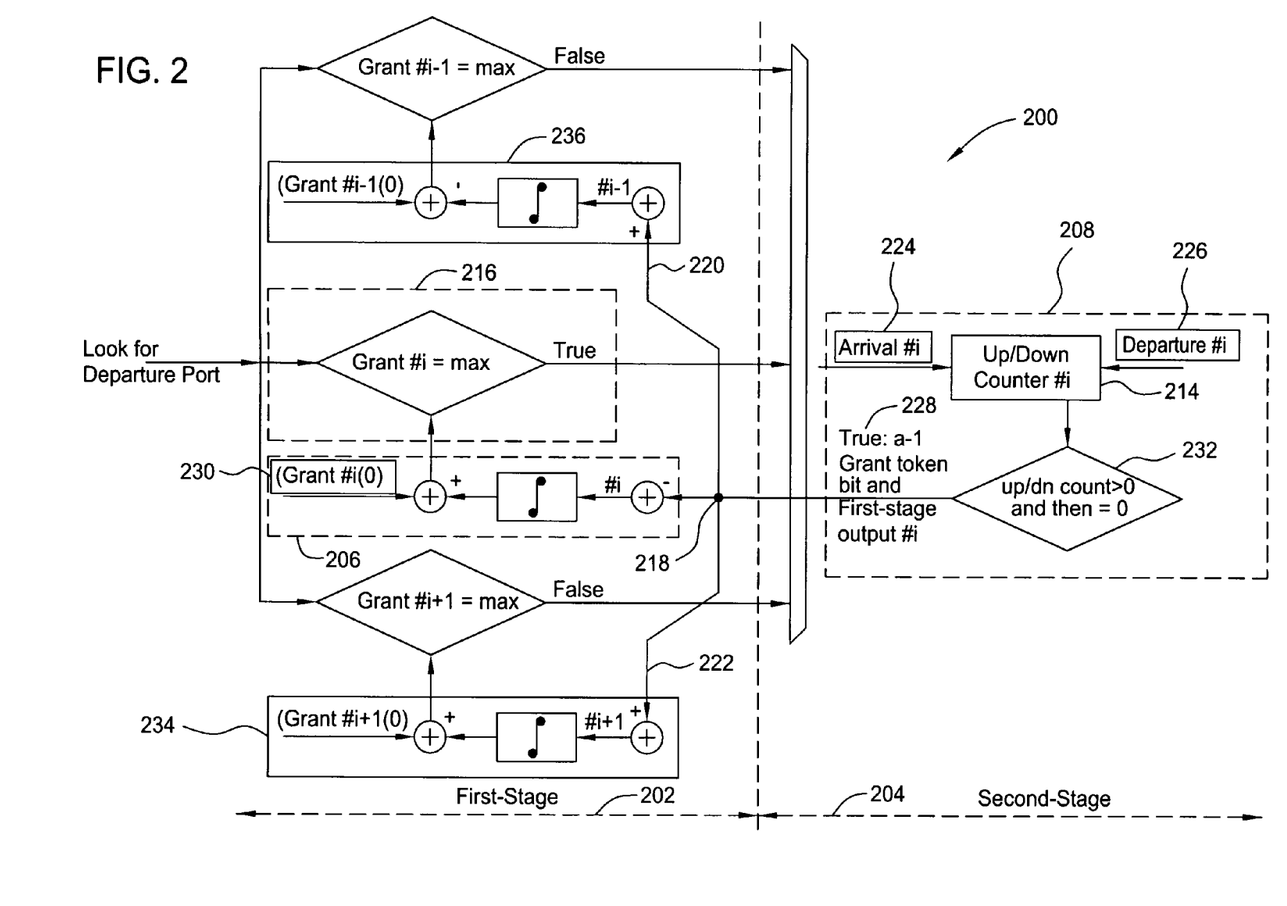
FIG. 2 is a diagram illustrating the structure of credit-based adaptive flow control logic inside each switch element in Stage-1 and inside each crossconnect element in Stage-2 in one embodiment of the present invention.

FIG. 2 illustrates the credit-based adaptive flow control logic 200 in the first stage ("Stage-1") 202 and second stage ("Stage-2") 204 of the present invention. In describing the present invention, the term "input element" will be used synonymously with an input port processor (114 FIG. 1) while the term "output element" used synonymously with an output port processor (120 FIG. 1). For example, elements 0 to M-1 of first stage refer to the port processors 0 to M-1 (114 FIG. 1) of switch elements 0 to L-1 (108a to 108n FIG. 1) in the first stage as shown in FIG. 1. Elements 0 to L-1 of second stage refer to port processors 0 to L-1 (116 FIG. 1) of cross-connect elements 0 to N-1 116a to 110n FIG. 1) in the second stage. Similarly, input elements 0 to N-1 (118 FIG. 1) of third stage refer to the input port processors 0 to M-1 (122 FIG. 1) of switch elements 0 to L-1 (112a to 112n FIG. 1) in the third stage.

Referring back to FIG. 2, the first stage 202 includes a plurality of first stage output elements, each of which plurality includes a threshold block 216 and an integrator block 206. The second stage 204 includes a plurality of second stage elements, each of which plurality includes a statistics block 208 corresponding to the threshold block 216/integrator block 206 in the first stage. Grant$_i$(0) shown at 230 for i=0, . . . , M-1, of the integrator block is the initial value of Grant$_i$(k) when time k is equal to 0. The value of Grant$_i$(0) 230 depends upon the switch latency of the second stage 204 and traffic class of an arriving data packet. Each integrator block 206 of Stage-1 202 accumulates the grant tokens received from Stage-2 204 with the initial value grant$_i$(0) 230 as a starting point. Each integrator block 206 such as i-th integrator takes as input the logic values or token bits representing grant tokens from the corresponding statistics block 208, i.e., i-th block Stage-2, as well as from its neighboring blocks #(i−1) and #(i+1).

As shown in FIG. 2, each statistics block 208 of Stage-2 accumulates the number of arrivals and departures by incrementing the statistics counter 214 by 1 for each arrival and by decrementing the statistics counter by 1 for each departure. A statistics block may include a simple up/down counter 214 for incrementing a count when a packet arrives, and decrementing a count when the packet departs. The counter 214 may be coupled to a logic circuit 232 which evaluates to "true" value when the counter 214 is incremented and then decremented for a particular packet arrival and departure. The "true" value triggers a token bit to be sent back to the first stage switch elements as shown.

In the present invention, the second stage is bufferless, i.e., the second stage receives arriving data packets and transmits them to the third stage without storing or queuing the data packets in the second stage. The arrival and departure of data packets in the second stage are maintained by the second stage statistics block 208. As described above, the second stage statistics block 208 is arranged to accumulate the real-time statistics of data packet arrivals and departures. Every new arrival 224 and departure 226, to and from i-th element of Stage-2 204 triggers sending out a feedback token or a token bit, shown at 228, back to the i-th output element of Stage-1 202. When the new arrival departs Stage-2, the counter 214 is decremented by 1 as shown at 226. When a feedback token is triggered as a result of a new arrival, the grant credit of the i-th output element of Stage-1 is decreased by 1 while the grant credits of the (i−1)-th output element and (i+1)-th output element in Stage-1 are increased by 1. This unique adaptive filtering process effecting the credit-based adaptive flow control in a multi-stage multi-dimensional switching architecture is shown in FIG. 2 by the arrows at 218, 220, 222 leading back to i-th, (i−1)-th, and (i+1)-th output elements in Stage-1, respectively. The arrow at 228 illustrates a logic value "a" as an example of a token bit being transmitted back to the first stage switch elements.

With the above-described method, statistics block 208 (e.g., i-th element) updates the threshold block 216 via the integrator block 206 when data packets arrive and depart at Stage-2. The corresponding first stage integrator block 206 (e.g., i-th output element) receives logic values or token bits from the statistic block 208 and updates grant credits. Briefly, grant credits represent the availability of a second stage element to receive an incoming data packet for routing. At the same time, the first stage integrator 236 that is above the corresponding first stage integrator 206 and the first stage integrator 234 that is below the first stage integrator 206 receive logic values or token bits from the statistics block 208 also and update their grant credits accordingly. When the filtering technique of the present invention described above is employed, the grant credits in the "threshold" blocks of the present invention converge to a nearly uniform probability distribution, and therefore the traffic between the first stage and second stage becomes balanced. Thus, in one embodiment of the present invention, a nearly uniform distribution probability is used as a reference in this adaptive "threshold" filtering technique.

The operation of a "threshold" filtering of the present invention will now be described in greater detail herein below with reference to equations (1) to (7). The i-th element among the plurality of processors in the switch architecture represents an element being considered, (i−1)-th element represents an element above the i-th element, and (i+1)-th element represents an element below the i-th element in the switch architecture.

By using statistical information derived from the normal switching operation, the filtering process of the present invention estimates data flow and balances them in the multi-stage multi-dimensional data switch architecture without requiring specific information from the previous stage.

When $grant_i(k)$=maximum among $\{grant_i(k), i=0, N-1\}$ and the packet is thus sent from the i-th output element of the first stage to the i-th element of Stage-2, then the first stage does the following updates upon receiving the token bit from the second stage:

$$grant_i(k+1) = grant_i(k) - 1, \quad (1)$$

$$grant_{i-1}(k+1) = grant_{i-1}(k) + 1, \quad (2)$$

$$grant_{i+1}(k+1) = grant_{i+1}(k) + 1, \quad (3)$$

i=0, . . . , N−1.

The following two end conditions are maintained. For Upper Boundary, when $grant_0(k)$=maximum among $\{grant_i(k), i=0, \ldots, N-1\}$ and the packet is thus sent to the 0-th element of Stage-2, the first stage integrator blocks perform the following operations upon receiving the token bit from the second stage:

$$grant_0(k+1) = grant_0(k) - 1, \quad (4)$$

$$grant_1(k+1) = grant_1(k) + 1. \quad (5)$$

For Bottom Boundary, when $grant_{M-1}(k)$=maximum among $\{grant_i(k), i=0, \ldots, N-1\}$ and the packet is thus sent to the (M−1)-th element of Stage-2, the first stage integrator blocks perform the following operations upon receiving the token bit from the second stage:

$$grant_{M-1}(k+1) = grant_m-1(k) - 1, \quad (6)$$

$$grant_{M-2}(k+1) = grant_{M-2}(k) + 1. \quad (7)$$

In one embodiment of the present invention, the search for the maximum among $\{grant_i(k), i=0, \ldots, N-1\}$ at each switch element of the first stage is performed in the ascending order from 0 to N−1.

Figure 3:
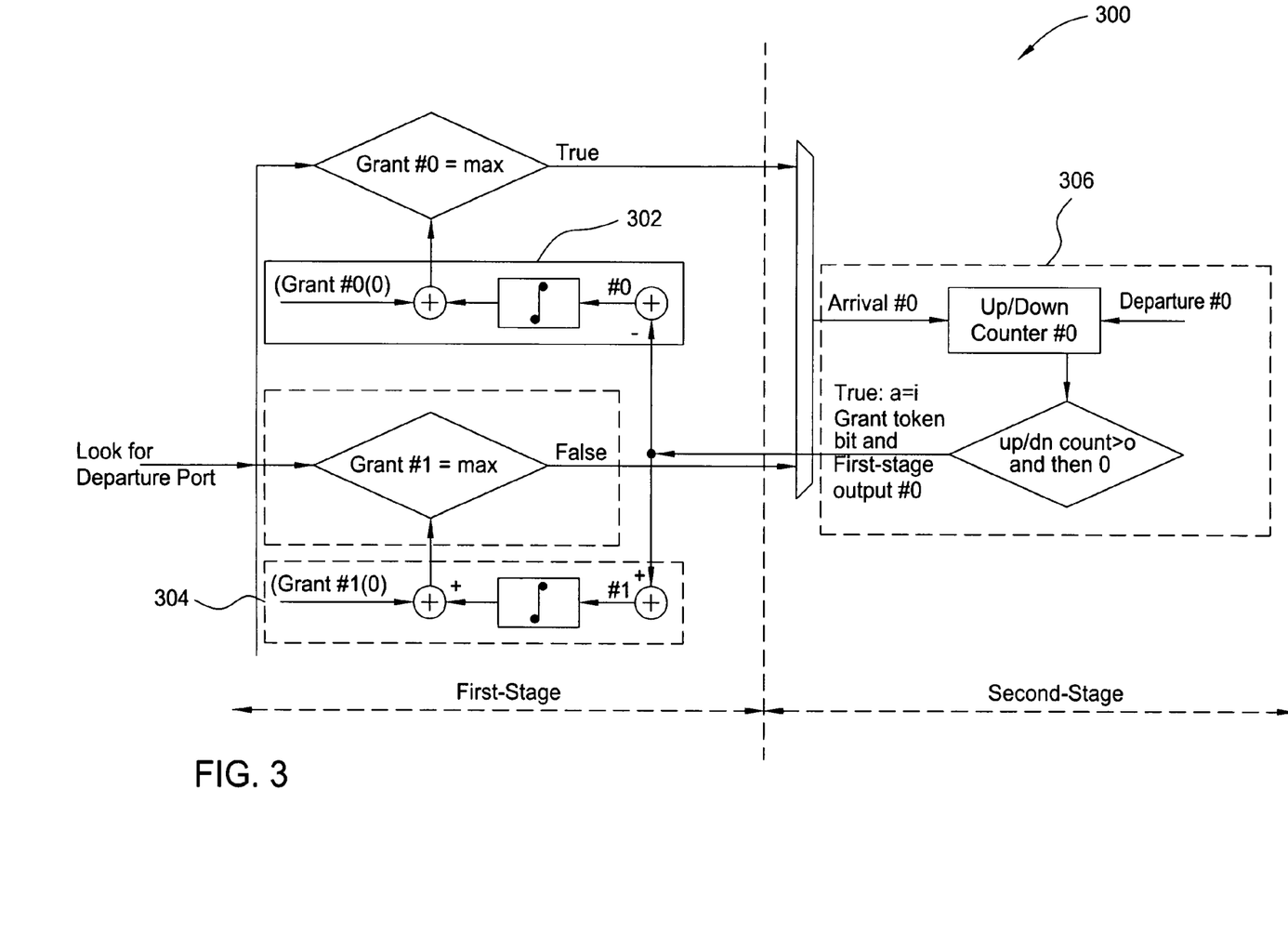
FIG. 3 shows the upper boundary structure of the credit-based adaptive flow control logic in one embodiment of the present invention.

FIG. 3 shows the upper boundary structure of the credit-based adaptive flow control logic. The integrator block #0 302 receives as input the logic values from the corresponding statistics block #0 306 of Stage-2 and its only neighboring block #1. The upper boundary grant credit update is shown by equations (4) and (5).

Figure 4:
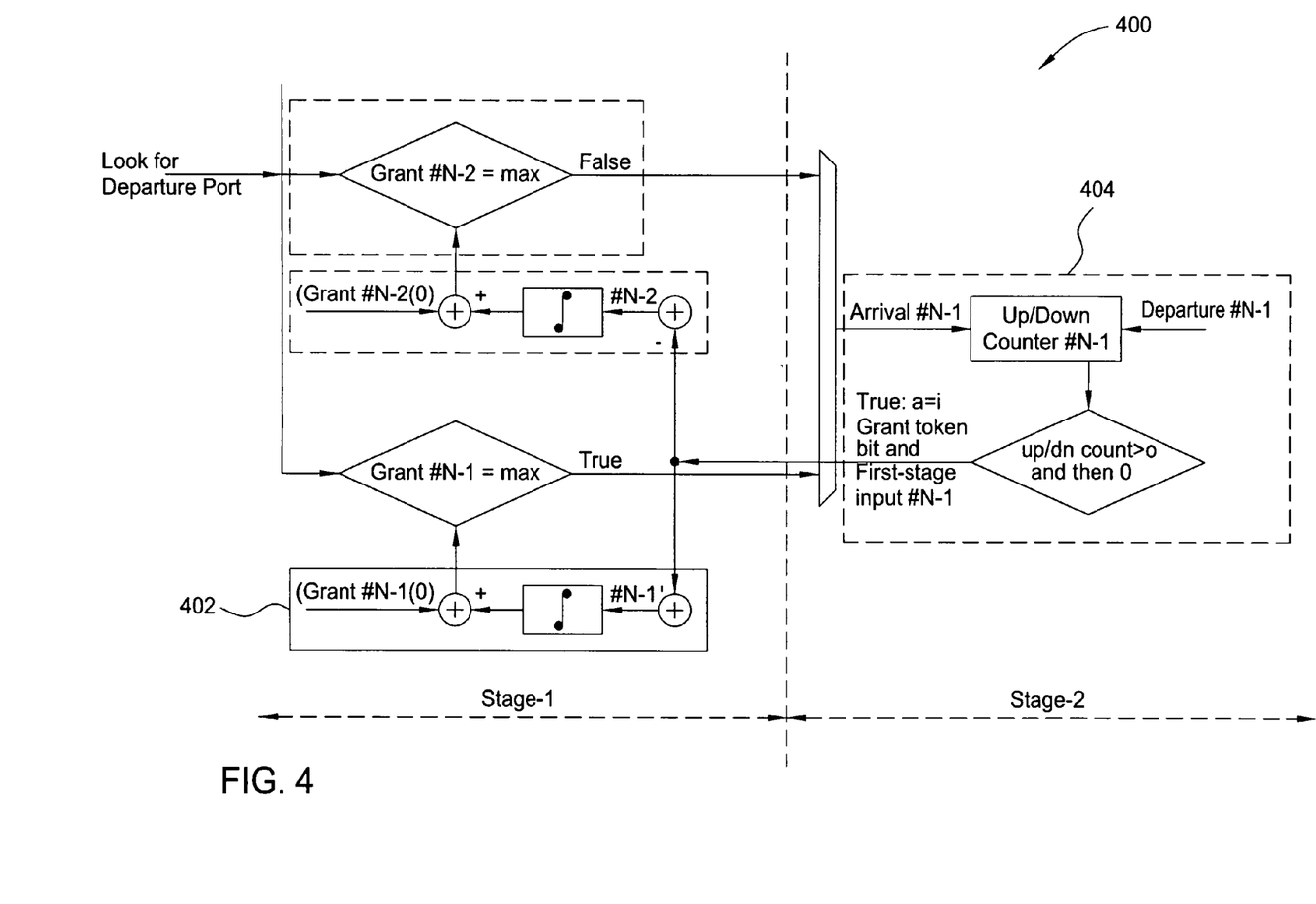
FIG. 4 shows the bottom boundary structure of the credit-based adaptive flow control logic in one embodiment of the present invention.

FIG. 4 shows the bottom boundary structure of the credit-based adaptive flow control logic. The detailed structure of the switch is the same as shown in FIG. 2 with the exception that the (N−1)-th integrator block 402 receives as input the logic values from the corresponding statistics block #(N−1) 404 and its only neighboring block #(N−2). The bottom boundary grant credit update is shown by equations (6) and (7).

Figure 5:
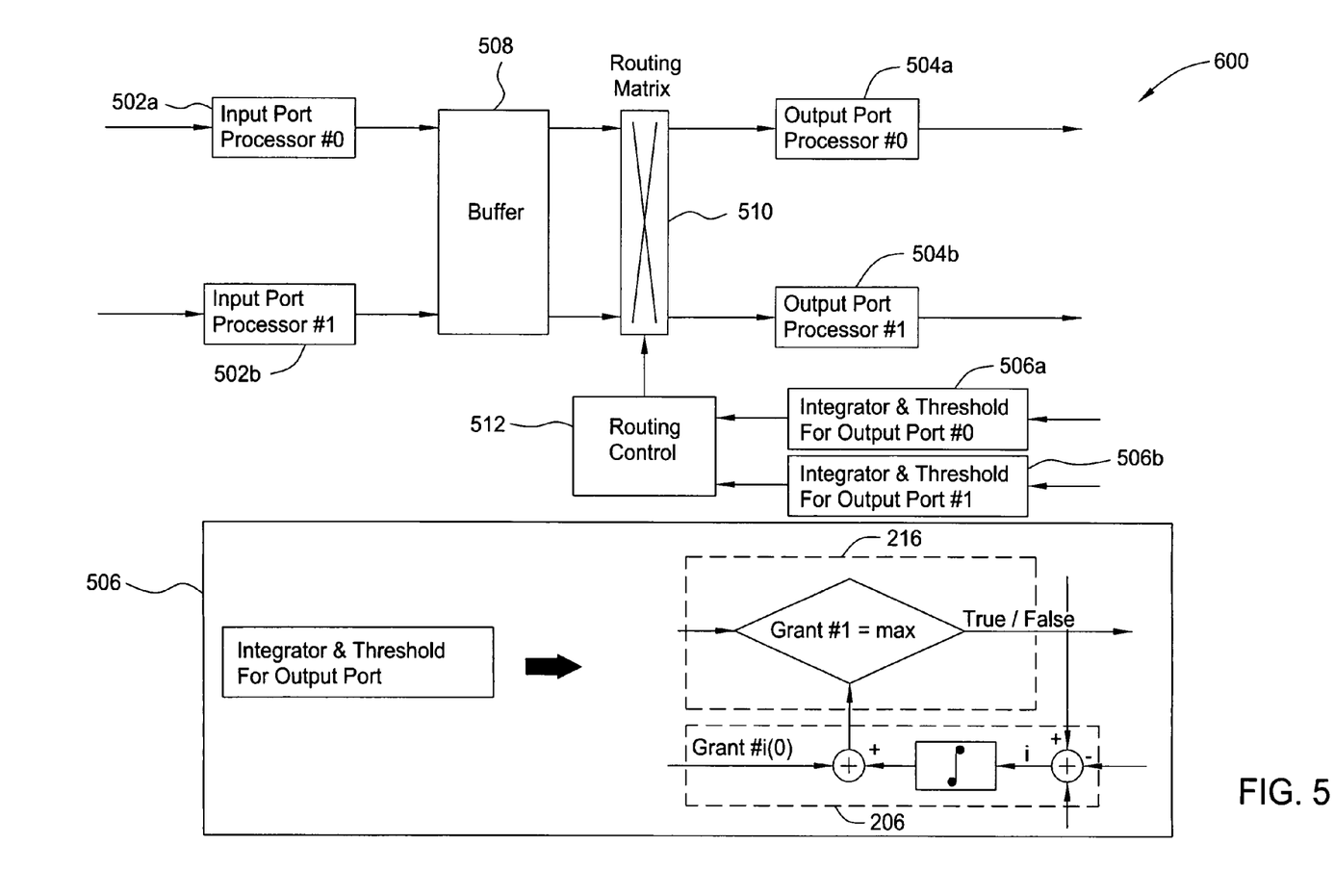
FIG. 5 is a diagram illustrating a detailed internal logic flow of a two-port first stage switch element in one embodiment of the present invention.

FIG. 5 is a diagram 500 illustrating a detailed internal structure and logic flow of a two-port first stage switch element. Each M×N port processors (114, 120 FIG. 1) of first stage includes an input port processor 502a, an output port processor 504a, and an integrator 206 and threshold 216 blocks 506a. The detailed logic flow of these devices was described herein above with reference to FIG. 2. Generally, the data arriving at the input port processor 502a is routed to the second stage element via the output port processor 504a. In one embodiment, the data buffer 508, the routing matrix 510, and the routing control 512 is shared among the input and output port processors 502a, 502b, 504a, 504b. As shown, each output port processor (120 FIG. 1) includes integrator and threshold blocks 506a, 506b coupled to the output port processors 504a, 504b. The detailed structure of the integrator and threshold block is shown at 506. The logic flow of the integrator and threshold block was described herein above with reference to FIG. 2.

Figure 6:
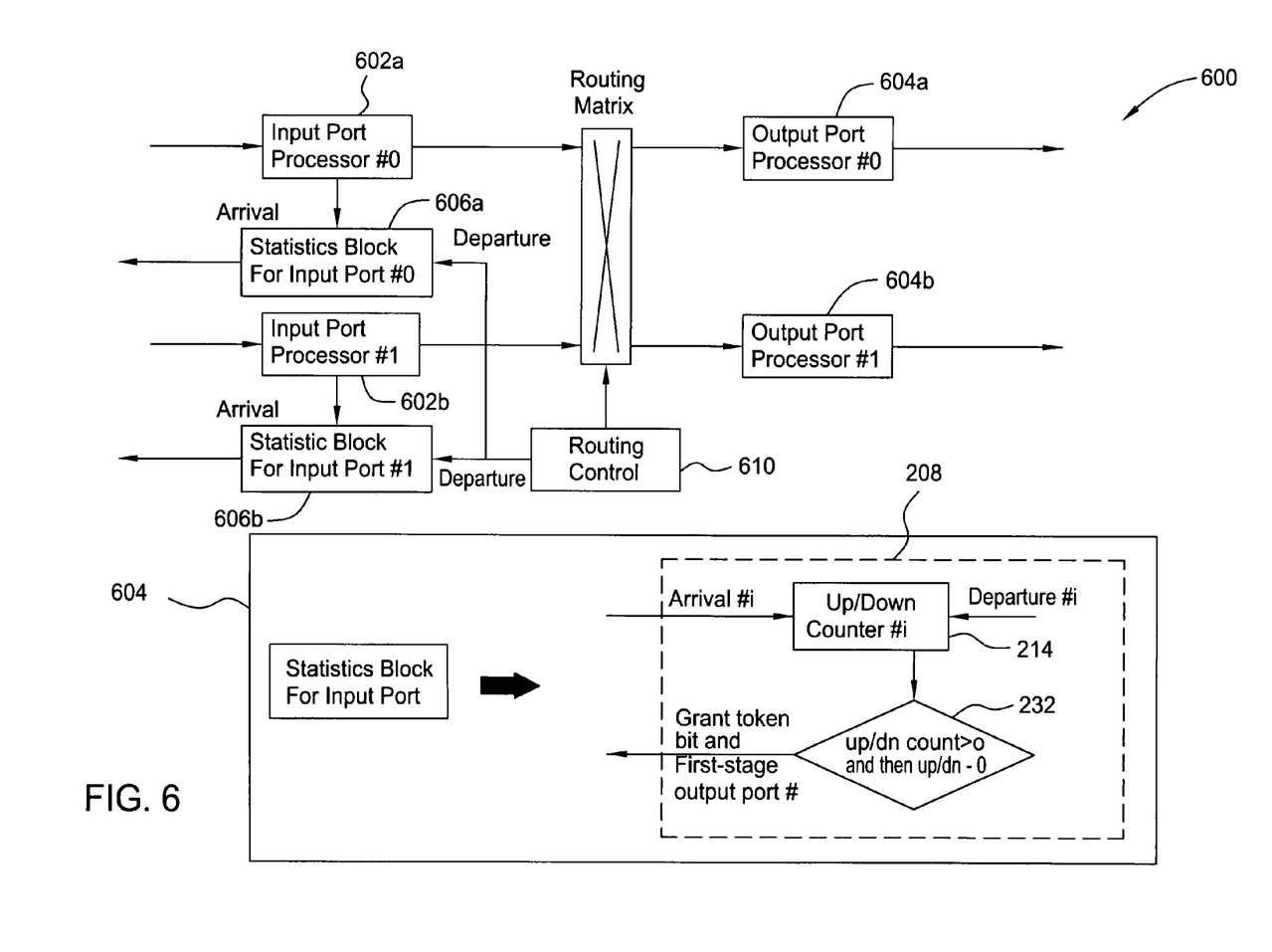
FIG. 6 is a diagram illustrating a detailed internal logic flow of a second stage crossconnect element in one embodiment of the present invention.

FIG. 6 is a diagram 600 illustrating a detailed internal structure and logic flow of a second stage crossconnect element. Each L port processor (116 FIG. 1) of second stage includes an input port processor 602*a*, an output port processor 604*a*, and a statistics block 606*a*. The detailed logic flow of these devices was described herein above with reference to FIG. 2. Generally, when a data packet arrives at the input port processor 602*a*, the statistics block 606*a* increments an up/down counter 214 by one. When the data packet is routed to the output port processor 604*a* or 604*b* via the routing control 610 and routing matrix 608, the statistics block 214 decrements its up/down counter by one. When the up/down counter 214 is greater than zero, it signifies a data arrival at the input port processor 602*a*; when the data packet departs at the output port processor 604*a*, a token bit is transmitted to corresponding and neighboring integrator blocks 206 of first stage elements.

While the invention has been particularly shown and described with respect to an embodiment thereof, it will be understood by those skilled in the art that the foregoing and other changes in form and details may be made therein without departing from the spirit and scope of the invention.

What is claimed is:

1. A multi-stage, multi-dimensional, credit-based, adaptive flow control switch comprising:
    a plurality of first stage port processors, each one of the plurality of first stage port processors having an integrator block for receiving a token bit and updating a grant credit in response to receiving the token bit;
    a plurality of second stage port processors connected to the plurality of first stage port processors for receiving data packets from the plurality of first stage port processors, each one of the plurality of second stage port processors having a statistics block coupled to a corresponding integrator block;
    a plurality of third stage port processors connected to the plurality of second stage port processors;
    wherein the statistics block is further coupled to one or more neighboring integrator blocks for transmitting a token bit to the corresponding integrator block and the one or more neighboring integrator blocks, the statistics block transmitting the token bit in response to a second stage port processor associated with the statistics block receiving a data packet from one of the plurality of the first stage port processors;
    wherein the statistic block further comprises a real-time counter for accumulating real-time statistics of data packet arrivals from one of the plurality of first stage port processors and data packet departures to one of the plurality of third stage port processors.

2. The multi-stage, multi-dimensional, credit-based, adaptive flow control switch as claimed in claim 1, wherein the corresponding integrator block includes an (i)th integrator block and the one or more neighboring integrator blocks include an (i−1)th integrator block that is located above the corresponding (i)th integrator block.

3. The multi-stage, multi-dimensional, credit-based, adaptive flow control switch as claimed in claim 2, wherein the one or more neighboring integrator blocks further include an (i+1)th integrator block that is located below the corresponding (i)th integrator block.

4. The multi-stage, multi-dimensional, credit-based, adaptive flow control switch as claimed in claim 3, wherein the one or more neighboring integrator blocks increase associated grant credits in response to receiving a token bit from the statistic block.

5. The multi-stage, multi-dimensional, credit-based, adaptive flow control switch as claimed in claim 4, wherein the corresponding integrator block decreases an associated grant credit in response to receiving a token bit from the statistic block.

6. The multi-stage, multi-dimensional, credit-based, adaptive flow control switch as claimed in claim 5, wherein the plurality of first stage port processors includes one or more input ports and one or more output ports, wherein the arriving data packet is received at one of the one or more input ports and routed to an output port having a maximum number of grant credit.

7. The multi-stage, multi-dimensional, credit-based adaptive flow control switch as claimed in claim 1, wherein the switch further includes a relay from each one of the third stage port processors to the plurality of first stage port processors, and the token bit is transmitted to the first stage port processors by one of second stage port processor and the third stage port processor.

8. The multi-stage, multi-dimensional, credit-based, adaptive flow control switch as claimed in claim 7, wherein the plurality of first stage switch elements and the plurality of third stage switch elements are embedded on a single chip.

9. The multi-stage, multi-dimensional, credit-based, adaptive flow control switch as claimed in claim 1, wherein the one or more neighboring integrator blocks change associated grant credits in response to receiving a token bit from the statistic block.

10. The multi-stage, multi-dimensional, credit-based, adaptive flow control switch as claimed in claim 1, wherein the corresponding integrator block change an associated grant credit in response to receiving a token bit from the statistic block.

11. The multi-stage, multi-dimensional, credit-based, adaptive flow control switch as claimed in claim 1, wherein the statistics block departs the data packet.

12. An adaptive filtering method for controlling traffic flow in a multi-stage, multi-dimensional, switched network, comprising:
    notifying a plurality of first stage port processors in response to receiving a data packet from one of the plurality of first stage port processors, wherein the plurality of first stage port processors includes the one of the plurality of first stage port processors from which the data packet is received and at least one neighboring first stage port processor;
    updating grant credits associated with said one of the plurality of first stage port processors and the at least one neighboring first stage port processors processor in response to the notifying, wherein the updating grant credits comprises:
        decrementing a grant credit associated with said one of the plurality of first stage port processors; and
        incrementing one or more grant credits associated respectively with the one or more neighboring first stage port processors;
    determining a port processor among the plurality of first stage port processors for forwarding an incoming data packet by selecting an output port processor having a maximum grant credit;
    receiving the incoming data packet at the determined port processor; and
    routing the data packet to a corresponding second stage port processor.

13. The adaptive filtering method of claim 12, wherein the one or more neighboring first stage port processors include a first stage port processor coupled adjacent to said one of the plurality of first stage port processors.

14. A multi-stage, multi-dimensional, credit-based, adaptive flow control switch comprising:
- a plurality of first stage port processors adapted for receiving a token bit and updating a grant credit in response to receiving the token bit, each first stage port processor including one or more input ports and one or more output ports; and
- a plurality of second stage port processors connected to the plurality of first stage port processors for receiving data packets from the plurality of first stage port processors; and
- a plurality of third stage port processors connected to the plurality of second stage port processors;
- wherein each one of the plurality of second stage port processors having includes a statistics block adapted to transmit the token bit in response to a second stage port processor associated with the statistics block receiving a data packet from an output port of one of the plurality of the first stage port processors having a maximum number of grant credits;
- wherein the statistic block further comprises a real-time counter for accumulating real-time statistics of data packet arrivals from one of the plurality of first stage port processors and data packet departures to one of the plurality of third stage port processors.

15. The multi-stage, multi-dimensional, credit-based, adaptive flow control switch of claim 14, wherein each one of the plurality of first stage port processors further comprises an integrator block that performs the receiving and updating functions.

16. The apparatus of claim 15, wherein each of the statistics blocks are further coupled to a corresponding integrator block and to one or more neighboring integrator blocks.

17. The multi-stage, multi-dimensional, credit-based, adaptive flow control switch of claim 16, wherein the corresponding integrator block includes an (i)th integrator block and the one or more neighboring integrator blocks include an (i−1)th integrator block that is located above the corresponding (i)th integrator block.

18. The multi-stage, multi-dimensional, credit-based, adaptive flow control switch of claim 17, wherein the one or more neighboring integrator blocks further include an (i+1)th integrator block that is located below the corresponding (i)th integrator block.

19. The multi-stage, multi-dimensional, credit-based, adaptive flow control switch of claim 16, wherein the one or more neighboring integrator blocks change associated grant credits in response to receiving a token bit from the statistic block.

20. The multi-stage, multi-dimensional, credit-based, adaptive flow control switch of claim 19, wherein the one or more neighboring integrator blocks increase associated grant credits in response to receiving a token bit from the statistic block.

21. The multi-stage, multi-dimensional, credit-based, adaptive flow control switch of claim 16, wherein the corresponding integrator block changes an associated grant credit in response to receiving a token bit from the statistic block.

22. The multi-stage, multi-dimensional, credit-based, adaptive flow control switch of claim 21, wherein the corresponding integrator block decreases an associated grant credit in response to receiving a token bit from the statistic block.

23. The multi-stage, multi-dimensional, credit-based adaptive flow control switch of claim 14, wherein the switch further includes a relay from each one of the third stage port processors to the plurality of first stage port processors, and the token bit is transmitted to the first stage port processors by one of second stage port processor and the third stage port processor.

24. The multi-stage, multi-dimensional, credit-based, adaptive flow control switch of claim 14, wherein the plurality of first stage port processors and the plurality of third stage port processors are embedded on a single chip.

25. The multi-stage, multi-dimensional, credit-based, adaptive flow control switch of claim 14, wherein the statistics block departs the data packet.

* * * * *